Patented Mar. 3, 1936

2,032,443

UNITED STATES PATENT OFFICE 2,032,443

FERMENTATION PROCESS

Alfred S. Schultz and George W. Kirby, New York, and Charles N. Frey, Scarsdale, N. Y., assignors to Standard Brands Incorporated, New York, N. Y., a corporation of Delaware No Drawing. Application September 26, 1934, Serial No. 745,526

12 Claims. (Cl. 260—120)

The invention relates to a process for increasing the nitrogen content of fermentable masses. More particularly, it relates to the production of a yeast fermentable mash containing lactic acid in the form of an ammonium salt, and includes correlated improvements and discoveries whereby the yeast assimilable nitrogen content is enhanced.

Lactic acid heretofore has been formed in mashes or worts in a discontinuous and in a continuous manner. When produced in a discontinuous process the acidulation is started through the introduction of a pure culture of lactic acid bacilli. This was usually effected by utilization of a small quantity of a previously produced acid mass. The acidulation was permitted to continue until the desired degree of acidity was attained, whereupon the acid mash so produced was suitable for subjection to yeast fermentation.

It was known that the formation of lactic acid under such conditions ceased when a certain concentration of acid had been reached. The cessation in acid formation depended upon the temperature at which the acidulation was taking place and upon the character of the lactic acid organism. A continuation of the acid formation was effected by neutralizing the mass with an alkali, thus converting the lactic acid into a salt and permitting the organism to convert a further amount of carbohydrate material into the acid. Most frequently, calcium carbonate was added which reacts with lactic acid forming a precipitate of calcium lactate. The neutralization of the lactic acid has also been carried out by the addition of ammonia or strongly alkaline ammonia combinations, such as, for example, ammonium hydroxide and hexamethylenetetramine. The lactic acid formed was wholly or partially neutralized, following which the bacilli continued the conversion of carbohydrate and the neutralizations were repeated until the desired amount of lactic acid was formed, or until the quantity of lactic acid salt produced prevented further conversion.

It is an object of the present invention to provide a process for the production of lactic acid by fermentation in which neutralization of formed acid is effected by ammonia released from carbamid.

Another object of the invention is to provide a process in which concentration of lactic acid formed by fermentation is decreased by neutralization with ammonia liberated through enzymic action.

A further object of the invention is to provide a process in which the concentration of lactic acid formed by fermentation is lowered by addition thereto of carbamid and urease, e. g., in the form of ground soy bean.

An additional object of the invention is to provide a process for the production of lactic acid by fermentation in which the formed acid is gradually neutralized with the production of substantial quantities of ammonium salts suitable for subsequent utilization in the propagation or growing of yeast.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the application of which will be indicated in the claims.

In the practice of the invention lactic acid is produced in a mash by fermentation, and acid so formed neutralized by ammonia liberated through enzymic action. A mash or wort containing carbohydrate material which may be prepared from grain, a saccharine material, as molasses, or an admixture thereof, is inoculated with a lactic acid bacillus and incubated at a temperature suitable for the production of lactic acid by the particular bacillus being utilized. Preferably the bacillus utilized is of a strain known as the bacillus Delbrucki, and the liberation of ammonia is effected through the employment of a carbamid in conjunction with urease.

According to the invention a quantity of a carbamid and urease which may be in the form of ground soy bean, but not so limited, may be added to the mash at a suitable period during the fermentation. The formation of lactic acid is allowed to proceed with accompanying determinations of the acidity being made at desired intervals. When it is observed that the acid concentration is increasing, a further quantity of carbamid and/or urease may be added to maintain or reduce the acid concentration. These additions may be made simultaneously or the carbamid may be added first and the urease after a short period and during intervals. Such added quantities are introduced as are shown to be required by the acid determinations. In the event that the concentration of acid has become too great for an effective action of the urease upon the carbamid, this concentration may be brought within the effective range by addition of an alkali, preferably ammonium hydroxide to the fermenting mass, whereupon further quantities of carbamid and urease, as soy bean, may be introduced.

The production of a fermentable mash or wort, more particularly may be accomplished by preparing a saccharine, for example, a molasses mash, heating to a suitable temperature, as 55° C., and inoculating with a bacillus Delbrucki culture. At the time of inoculation the pH value may be about 4.5 and incubation of the thus inoculated mass may take place at about 55° C. This temperature, it will be realized, may vary depending upon the bacillus and fermentation conditions desired, and usually will lie within the range of 30° to 58° C. When utilizing the bacillus Delbrucki we have found 55° C. to be a satisfactory working temperature. Following the inoculation and commencement of the incubation or fermentation period carbamid and urease, which is preferably added in the form of ground soy bean, are added and the fermentation permitted to proceed. The carbamid undergoes decomposition under the influence of the urease with the formation of ammonia which reacts with the lactic acid to form ammonium lactate, thus reducing the acid concentration and increasing the available nitrogen content through continued acid production and reaction with ammonia.

It has been found that the pH value of the fermentation mass influences the release of ammonia from carbamid, and accordingly this value is determined frequently during the progress of the fermentation. If the pH value decreases, that is, when the acid concentration increases, a further addition of carbamid and also of urease is made, and such additions are repeated as may be necessary to maintain or reduce the acid concentration. Our experiments have shown that it is desirable not to permit the pH value to fall below 3.8 since at this value carbamid is not effectively decomposed by urease, and should the acid concentration increase to or beyond a pH of 3.8, it may be brought back by a suitable addition of a neutralizing agent, as ammonium hydroxide. The fermentation is permitted to continue until the required quantity of ammonium lactate is produced, and this depends upon the type of mash desired for the yield of yeast to be obtained in the subsequent propagation. The ammonium lactate formed is of particular utility in the growing of yeast inasmuch as the ammonia content is easily available to the yeast and the acid formed through the splitting off of ammonia by the yeast does not readily reach a concentration which is deleterious to the yeast.

The production of lactic acid in accordance with the invention may be carried out as a batch process or as a continuous procedure. In the batch process the total amount of mash is prepared, brought to the desired temperature, for example 55° C., and inoculated with a suitable quantity of the bacilli, as bacilli Delbrucki. The temperature under which the fermentation proceeds advantageously is maintained, and addition of carbamid and a urease containing material made in amounts sufficient to neutralize acid formed through liberation of ammonia, whereby concentration of acid is maintained within the effective area or reduced. When the desired concentration of lactic acid in the form of ammonium salt is attained, the fermentation is arrested and the mass may be sterilized or not as is desired by the user for the propagation of yeast. It will be realized of course that if a high yield of yeast is to be sought during the propagation period the quantity of ammonium lactate produced will have to be greater in order to provide a sufficient quantity of nitrogen for the growing yeast.

When operating as a continuous procedure a carbohydrate material containing mash may be prepared of a fairly high concentration, and a portion of this material introduced into a fermenting vessel. This portion is then diluted to the desired degree, for example to 12° Balling and the fermentation or acid formation initiated. As the acid is formed a quantity of the mash may be removed to another fermenter and a like quantity of fresh carbohydrate material added to the first fermenter. A portion of the fermenting mash in the second fermenter may then be withdrawn to a third fermenter and from thence on there may be a continuous addition of carbohydrate material to the first fermenter in the series and a continuous withdrawal of finished acidified and neutralized mash from the last fermenter in the series.

The addition of carbamid and urease, as ground soy bean, may be made in all or less of the fermenters as appears most satisfactory according to the progress of the fermentation. These additions are to be made in accordance with the procedure outlined above depending upon the determined acid concentrations. Further, the additions of carbamid and urease, as soy bean, may be made in various ways, as follows—the full quantity of carbamid and urease may be added immediately subsequent to the inoculation of the mass with the lactic acid bacilli; the full quantity of carbamid and a part of the urease may be added immediately following inoculation and subsequent additions of urease made during the progress of the fermentation; the full quantity of urease and a part of the carbamid may be added at the inception of the fermentation and further quantities of carbamid added as is necessary to reduce and maintain the acid concentration, or partial quantities of carbamid and urease may be first added, and during the fermentation additional quantities of these materials will be added to effect neutralization of formed acid.

As an illustrative embodiment of a manner in which the invention may be practiced, the following examples are presented. The mash used as above indicated may be either a grain, a saccharine, as a molasses, or a combined grain and saccharine mash. For illustrative purposes, a mash will be utilized which has been prepared in the following manner. A suitable sugar material, such as cane molasses or a mixture of cane or beet molasses, preferably one containing a major quantity of cane molasses, is clarified as by the addition thereto of about 3% calcium superphosphate ($CaH_4(PO_4)_2$), or of ammonium acid phosphate ($NH_4H_2PO_4$). After filtration the clarified molasses may be diluted to a suitable degree to obtain a solution of 12° Balling. A pony mash may be formed from the molasses solution prepared as above by heating it to about 55° C., inoculating with a culture of the bacillus Delbrucki, and incubating at 55° C. It was found that the pH value of this solution at time of inoculation was about 4.5 and at the end of the incubation, for example, after three hours, the pH was 3.9. In the examples given the acidulated pony mash so obtained is utilized as the inoculating medium.

Example I

To three liters of the 12° Balling molasses mash heated to a temperature of about 55° C., there is added for inoculation about 250 cc. of the pony acidulated mash. The inoculated mash is now incubated or fermentation allowed to proceed at a temperature of about 55° C. The pH value at inoculation was found to be 4.5. Immediately after there was added to the mash about 4.1 grams of carbamid and 10 grams of ground soy bean. The pH value determinations during the course of fermentation showed a rise in value or decrease in acid content to approximate neutrality. The acidity thereafter increased until the mash had a pH value of about 3.8. At this value the urease is not effective in bringing about decomposition of carbamid with liberation of ammonia, and hence further addition of carbamid and of ground soy bean did not effect other than a maintenance in the pH value. There is thus produced a mash containing ammonium lactate in the quantity desired for subsequent utilization in yeast manufacture.

Example II

An inoculated mash was prepared in accordance with the procedure given in Example I. This mash had an initial pH value of 4.5 and to it were added 1.5 grams of carbamid and 10 grams of ground soy bean. After a period of time a further addition of 1 gram of carbamid was added at a pH value of 4.6 and later there were added 1.5 grams of carbamid at a pH value of 4.1. Still later 4.0 grams of carbamid and 1.0 grams of ground soy bean were added. Thence, after a period of several hours the pH value had dropped to 3.9 whereupon 4.0 grams of carbamid were added. The pH value remained at 3.9 and an addition of ammonium hydroxide was made bringing the pH value to about 4.6 The fermentation was then allowed to proceed until the desired ammonium lactate content was attained.

Example III

A mash obtained as set forth in Example I and having a pH value of 4.5 had added to it 4.1 grams of carbamid and 2 grams of ground soy bean. Subsequently as the pH value decreased two additions were made of 2 grams ground soy bean each. The pH continued to fall to a value of 3.8. There were then added 4 grams of carbamid, the pH value being at a point at which urease does not effectively decompose carbamid, an adjustment of pH was effected to a value of 4.5 by the addition of alkali, and then 10 grams of ground soy bean were added. After an interval the pH value increased to 6.5 with attending formation of ammonium lactate.

Example IV

An inoculated mash was prepared as in Example I, and of a pH value of 4.4. To the thus inoculated mash there were added 10 grams of ground soy bean and 10 grams of carbamid. The pH value gradually increased from 4.4 to about 7.2 during a period of about one hour and a half and decreased during a subsequent period of about 20 hours to 4.0. A continuous production of lactic acid with neutralization by liberated ammonia ensued throughout the fermentation period without addition of soy bean and carbamid other than that initially made.

In accordance with the foregoing procedures there may be produced a mash containing lactic acid in the form of ammonium lactate and in a concentration suitable for the utilization of the prepared mashes in the manufacture of yeast. We found in our experiments that there was a marked increase in the Formol number as the fermentation proceeded indicating an increase in the amount of ammonium lactate or nitrogen available for yeast assimilation. Thus while the initial Formol number was 1.2, at the completion of the procedure set forth in Example I, the Formol number was 4.0; Examples II and III, 7.0, and Example IV, 9.6.

It will be realized, and as has been indicated hereinabove, the invention in its broader aspects is not limited to the specific temperatures, concentrations, and intervals for adding ingredients as specifically set forth in the foregoing examples. Thus the temperature may vary depending upon the lactic acid bacillus employed from 30–58° C. The initial acid concentration may be lower or even higher than a pH 4.5, and the concentration of the mash may be other than about 12° Balling, for example, a mash of 15° B. or of 3° B. may be used. The urease addition may be made not only through the medium of ground soy bean which is the most prolific readily available source of urease but other urease containing materials as various legumes, for example, the jack bean, may be used.

The process may be conducted as specifically described above as a batch process, or as a continuous process in which event a lower degree Balling saccharine mash would be prepared, and the fermentation period may be longer or shorter as the requirements for subsequent yeast yield necessitate. More particularly, with respect to the acid concentration it is shown above that a value of less than about 3.8 is to be avoided whereas the value may rise as high as 7.2, that is, slightly beyond neutrality. It is to be realized that it is desirable that the acidity should be maintained within the range at which urease decomposition of carbamid takes place effectively and that this range may be maintained by the addition of appropriate amounts of carbamid and of soy bean so that a continued and sufficient liberation of ammonia will ensue.

The procedures given above show also that the neutralization of formed acid may be brought about wholly by carbamid and soy bean, or partially by this means and partially by the addition of an alkali, as ammonium hydroxide.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. A process for the production of lactic acid which comprises producing lactic acid in a mash by fermentation, and neutralizing acid so produced by the decomposition of carbamid with urease in said mash.

2. A process for the production of lactic acid which comprises producing lactic acid in a mash by fermentation, and neutralizing acid so produced by the decomposition of carbamid with urease in said mash with maintenance of the acidity at a pH greater than 3.8.

3. A process for the production of lactic acid which comprises producing lactic acid in a molasses mash by fermentation with bacillus Delbrucki, and neutralizing acid so produced by ammonia formed by the decomposition of carbamid with urease in said mash.

4. A process for the production of lactic acid which comprises producing lactic acid in a molasses mash by fermentation with bacillus Delbrucki at a temperature of about 55° C., and neutralizing acid so produced by ammonia formed in said mash by the decomposition of carbamid with urease.

5. A process for the production of lactic acid which comprises producing lactic acid in a molasses mash by fermentation at a temperature of 30 to 58° C., and neutralizing acid so produced by ammonia formed in said mash by the decomposition of carbamid with urease.

6. A process for the production of lactic acid which comprises producing lactic acid in a molasses mash of about 12° Balling by fermentation with bacillus Delbrucki at a temperature of about 55° C., and neutralizing acid so produced by ammonia formed in said mash by the decomposition of carbamid with urease with maintenance of the acidity at a pH greater than 3.8.

7. A process for the production of lactic acid which comprises producing lactic acid in a molasses mash of about 12° Balling by fermentation with bacillus Delbrucki at a temperature of about 55° C., and neutralizing acid so produced partially by ammonia formed in said mash by the decomposition of carbamid with urease and partially by addition of ammonium hydroxide.

8. A process for the production of lactic acid which comprises inoculating a carbohydrate containing material mash with a lactic acid bacillus, fermenting at a temperature of 30 to 58° C., and neutralizing acid so formed by ammonia liberated in said mash by the decomposition of carbamid with urease.

9. A process for the production of lactic acid which comprises inoculating a molasses mash of about 12° Balling at a temperature of about 55° and a pH value of about 4.5 with bacillus Delbrucki, fermenting at a temperature of about 55°, and neutralizing acid so formed by ammonia liberated in said mash by the decomposition of carbamid with urease in the form of ground soy bean.

10. A process for the production of lactic acid which comprises inoculating a molasses mash of about 12° Balling at a temperature of about 55° and a pH value of about 4.5 with bacillus Delbrucki, fermenting at a temperature of about 55°, and neutralizing acid so formed by ammonia liberated by decomposition of carbamid with urease in the form of ground soy bean, said carbamid and ground soy bean being added at intervals and in quantities sufficient to give a continued decomposition of carbamid with release of ammonia and maintenance of acidity at a pH value greater than 3.8.

11. A process for the production of lactic acid which comprises producing lactic acid in a mash by fermentation and neutralizing acid so produced by means of ammonia liberated in said mash through enzymic action.

12. A process for the production of lactic acid which comprises producing lactic acid in a mash by fermentation and neutralizing acid so produced by the decomposition of a carbamid with urease in said mash.

ALFRED S. SCHULTZ.
GEORGE W. KIRBY.
CHARLES N. FREY.